June 19, 1951     T. B. LAVELLE     2,557,829
AIRCRAFT CONTROL MEANS

Filed Nov. 7, 1947     2 Sheets—Sheet 1

INVENTOR:
THOMAS B. LAVELLE
BY Albert Sperry
ATTORNEY

June 19, 1951  T. B. LAVELLE  2,557,829
AIRCRAFT CONTROL MEANS
Filed Nov. 7, 1947  2 Sheets-Sheet 2

INVENTOR:
THOMAS B. LAVELLE
BY Albert Sperry.
ATTORNEY

Patented June 19, 1951

2,557,829

UNITED STATES PATENT OFFICE 2,557,829

AIRCRAFT CONTROL MEANS

Thomas B. Lavelle, Newtown, Pa.

Application November 7, 1947, Serial No. 784,685

6 Claims. (Cl. 244—42)

My invention relates to aircraft, and particularly to means for controlling aircraft by the use of slots formed through the air foils thereof.

Heretofore it has been conventional practice to control aircraft by means of ailerons which are hingedly secured to the trailing edges of the air foils. With the advent of landing flaps it has been recognized that the use of such means as wing slots would be desirable so that the entire length of the trailing edge could be used for landing flaps, and controlled wing slots could then replace or supplement the usual ailerons. By proper formation and modification of wing slots and related elements it is possible to actuate the slots independently for lateral control purposes or they may be actuated simultaneously for effecting loss of lift in effecting a quick landing or for braking the speed of the air craft. However, flight tests and wind tunnel analysis of structures having slotted wings have disclosed serious defects in constructions of this type as heretofore produced. Thus, for example, if the slot in a wing is opened and closed by means of an upper flap or spoiler, it has been found that the response is sluggish, and movement of the wing lags appreciably behind the movement of the control means. Slots have also been previously designed in which the opening of the slot is controlled by means of coacting upper spoilers and lower flaps or air scoops which serve to direct air through the slot. However, such combinations have also been unsatisfactory, due to the fact that such combinations still fail to overcome the lag in response to the controls which occurs when the upper spoiler is raised.

My invention overcomes these objections by providing wing slots with upper spoilers and lower scoops, together with mechanism for controlling movement of the spoilers and scoops in a novel manner which serves to overcome the lag heretofore encountered in such systems. This result is preferably effected by providing means for producing a flow of air through the slot before the spoiler is raised to an aerodynamically effective position. In the construction here shown and described this result is attained by a differential in operation of the lower scoop and upper spoiler whereby the initial opening of the scoop may take place prior to or is more rapid than the opening of the upper spoiler. It has been found that this type of control materially increases the sensitivity of the airfoil in its response to the actuating means whereas the force necessary for operating the controls is minimized.

An object of my invention is to provide a new and improved slotted wing construction.

Another object of my invention is to provide novel mechanism for controlling operation of a spoiler and air scoop in a slotted wing.

A further object of my invention is to provide means for producing a flow of air through a slot prior to aerodynamically effective operation of a spoiler associated with the slot.

Another object of my invention is to provide a slotted wing having an upper spoiler and a lower scoop for opening and closing the slot together with improved means for producing different but related movements of the spoiler and scoop.

A further object of my invention is to provide means for moving the lower scoop into a slot opening position prior to effective opening of the upper spoiler.

These and other objects and features of my invention may be readily seen from the following description thereof in which reference will be made to the figures of the accompanying drawing.

Figure 1:
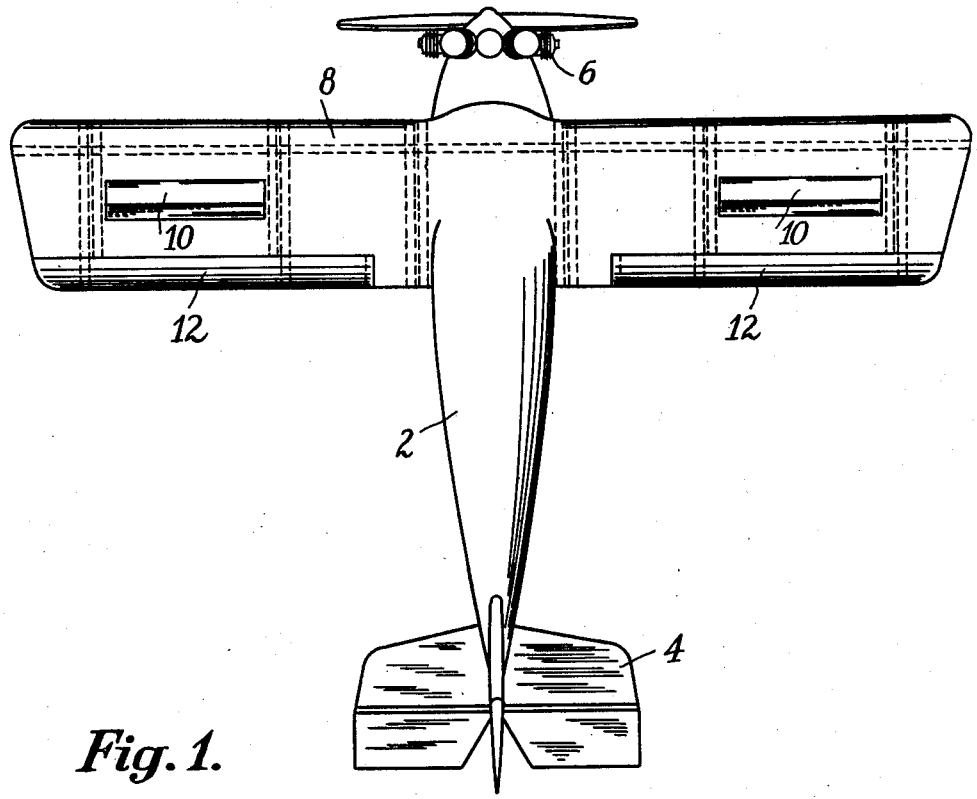
Fig. 1 is a diagrammatic plan view of an airplane embodying my new and improved air foil.

In that form of my invention shown in Fig. 1 an airplane is provided with a conventional fuselage 2, tail assembly 4 and power plant 6. The supporting air foil 8, however, does not have the customary ailerons, and instead has diagonally extending slots 10 positioned adjacent either extremity thereof. These slots are used for lateral control in place of or to supplement the operation of the ailerons and to allow substantially the entire length of the trailing edge of said air foil to be used as a landing flap or braking means 12. The slots 10 may also be used to effect a loss of lift for a "pancake" landing or to brake the speed of the aircraft.

The slots 10 are each provided with closure means at the upper and lower ends of the slot. These closure means are formed so that when closed they present outer surfaces that are flush with the adjacent upper and lower surfaces of the air foil. Thus the closure means for the upper end of slot 10 includes the upper spoiler 14 pivotally mounted at 16 in front of slot 10 and the air deflecting plate 18 pivotally mounted at 20 in the rear edge of the slot. The closure means for the lower end of the slot includes the air deflecting plate 22 pivotally mounted at 24 in front of the slot 10 and the lower air scoop 26 pivotally mounted at 28 in the rear edge of the slot. A slot defining plate 30 is pivotally connected along its upper longitudinal edge to the lower surface of the upper spoiler 14 as shown at 32 and is pivotally connected along its lower longitudinal edge at 34 to the inner surface of the air deflecting plate 22. In a similar way a slot defining plate 36 is pivotally secured along its upper edge to the lower surface of the air deflecting plate 18 as shown at 38 and is pivotally connected to the inner surface of the air scoop 26 at 40.

In this way the spoiler 14, slot defining plate 30 and the lower air deflecting plate 22 cooperate to provide a "three bar linkage" or quadrilateral type of assembly whereas the lower air scoop 26, slot defining plate 36 and the upper air deflecting plate 18 cooperate to provide a similar type of "three bar linkage" or quadrilateral type of assembly. Moreover, on pivotal movement of either the upper spoiler or the lower scoop, or when both the spoiler and scoop are moved to project from the adjacent surfaces of the air foil, the slot defining plates 30 and 36 are separated or moved apart to define an inclined slot or air passage having a shape in vertical cross section related to the position of the spoiler and scoop. In practice the slot defining plates are preferably connected to the spoiler and lower air deflecting plate and to the scoop and upper air deflecting plate in such positions that when the spoiler and flap are fully closed the slot defining plates are substantially parallel and spaced apart as shown in dotted lines in Fig. 2. When either the spoiler or the scoop are opened, whether such opening takes place successively or simultaneously, the slot serves to permit flow of air from the lower surface to the upper surface of the air foil to reduce the lift of the air foil and to cause that side of the aircraft to be lowered. Moreover, by proper proportioning in the length of the elements forming the "three bar linkage" of the spoiler and scoop assembly the slot defining plates 30 and 36 may be moved into and out of substantial parallelism so as to produce a slot having various predetermined shapes in cross section.

By controlling the movement of the spoiler and scoop it is possible to control the action of the air foil in much the same manner as when using the conventional ailerons. Furthermore, by moving the spoiler and scoop through different but related angles it is possible to present more or less spoiler or scoop action and it is also possible to vary the form of the slot in cross section so as to vary the action of the spoiler and to limit the force required to actuate the spoiler and scoop. Thus if the scoop 26 is opened through a greater angle or to a greater extent than the spoiler the slot 10 will be reduced in cross section in passing from the lower to the upper surface of the air foil as shown in full lines in Fig. 2. The pressure of the air on the slot defining plates 30 and 36 will then be relatively increased and the forces required to actuate the elements will be influenced accordingly. On the other hand if the spoiler is positioned at a greater angle or is opened more than the scoop the lower inlet end of the slot will be narrower than the upper outlet end, and the pressure of the air on the slot defining plates 30 and 36 will be relatively reduced and the control means will be similarly affected.

The action of the combined spoiler and scoop can thus be altered to meet varying conditions and to permit the location of the slot at different points in the wing or air foil or for use in different types of aircraft. Furthermore, the force exerted upon the slot defining plates by the air passing through the slots will vary from a condition of suction when the slot acts as a venturi to a condition of pressure when the slot acts as an air restricting means. The force necessary to actuate the spoiler and scoop can thus be varied to balance or overcome any tendency for these elements to oppose or act independently of the control means employed.

In the preferred form of my invention air is caused to flow through the slot and to the rear of the spoiler before the spoiler is raised sufficiently to become effective. For this purpose the scoop 26 is caused to have an initial opening movement which precedes or exceeds that of the spoiler. The slot is thus opened and air is caused to pass from the lower to the upper surface of the air foil before the spoiler has moved to a position in which it is aerodynamically effective. In this way I overcome the tendency for the air foil to rise slightly before it starts to descend, which is a characteristic that has been noted heretofore in wind tunnel tests on air foils having spoilers and scoops which open simultaneously and through equal angles. After the scoop has opened through a limited angle the spoiler preferably is opened more rapidly than the scoop and if desired the actuating means may be arranged to cause the scoop to close slightly as the spoiler reaches its maximum raised position. When actuated in this manner the aircraft is most sensitive and readily responsive to the operation of the control means, whereas the forces required to actuate the spoiler and scoop are not objectionably great and may be effectively balanced so as to preclude undesired operation thereof.

In order to move the spoiler and scoop in such a differential and related manner any suitable type of actuating means may be employed. As shown diagrammatically in Fig. 2, the actuating means may embody hydraulically or pneumatically operated pistons 41 and 43 controlled by valve means 45 for effecting the desired differential and sequence in movement of the spoiler and scoop. In the alternative the mechanism shown in more detail in Figs. 3 and 4 embodies a linkage arrangement such as "Watts Linkage." These or other types of actuating means may be interconnected and operated in a related manner through suitable or conventional control means exemplified by the operating rod 42 in Figs. 3 and 4.

Figure 3:
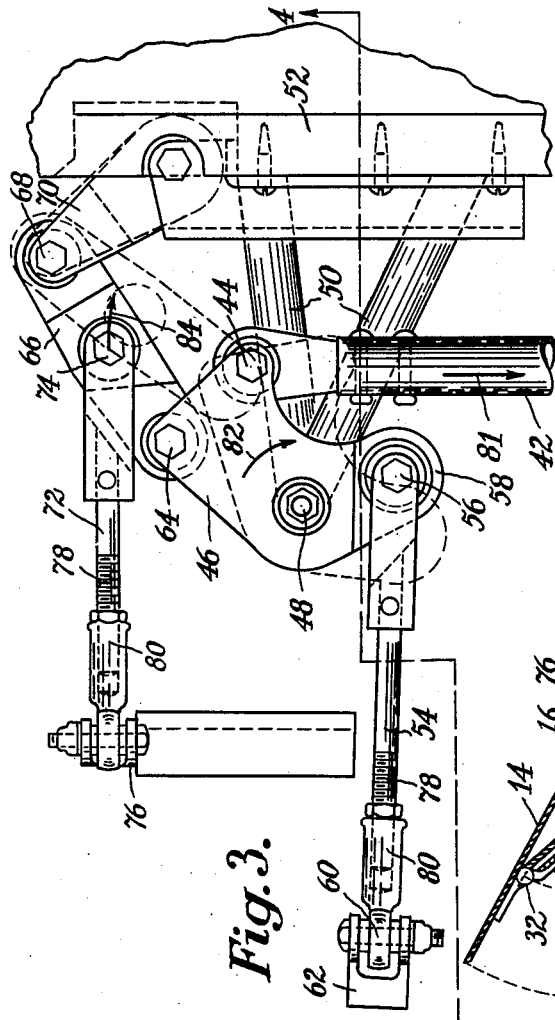
Fig. 3 is an enlarged horizontal view of a portion of an air foil embodying a preferred type of mechanism for operating the spoilers and scoops in accordance with my invention.
Figure 4:
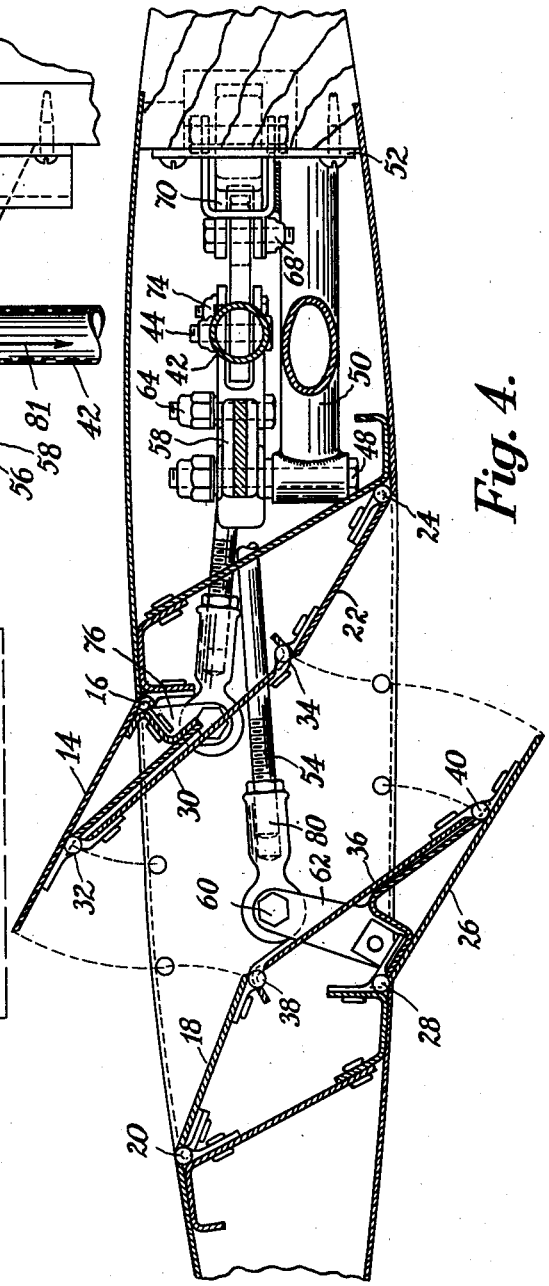
Fig. 4 is a vertical sectional view of the construction shown in Fig. 3 taken on the line 4—4 thereof.

In the construction shown in Figs. 3 and 4 the control means for effecting movement of the spoiler and scoop includes the operating rod 42 which is movable longitudinally in a direction parallel to the leading edge of the air foil. The operating end of the operating rod 42 is connected at 44 to the arm 46 of a bell crank mounted at 48 on a bracket 50 secured to the support 52 on the air foil. An actuating link 54 is connected at 56 to the other arm 58 of the bell crank and has its opposite end connected at 60 to an arm 62 fixedly secured to the lower scoop 26. The arm 46 of the bell crank is connected at 64 to one end of a floating link 66, whereas the opposite end of the floating link is connected at 68 to the pivoted arm 70. An actuating link 72 for the upper spoiler has one end connected at 74 near the center of the floating link 66 and is connected at its opposite end to the arm 76 fixedly secured to the upper spoiler 14.

One of the advantages in using this type of linkage as an actuating means resides in the fact that it affords an unfailing and positive mechanical connection between the control means and the spoiler and scoop and yet the degree of differential movement can be readily varied to adapt the invention to different conditions or different installations by simply varying the position of the point 74 at which the actuating link 72 for the spoiler is connected to the floating link 66. Such variations may be made by the use of interchangeable bell cranks or interchangeable floating links or by varying the position of the mid-point of the floating link 66. The actuating links 54 and 72 are also provided with adjusting means, such as the threaded portions 78 which cooperate with the threaded end portions 80 of the links, to alter the effective length of the actuating links and thereby assure balanced and free movement of the elements of the linkage.

With this construction, movement of the operating rod 42 in the direction of the arrow 81 (Fig. 3) will cause the spoiler and scoop to move from their opened position illustrated toward their closed position shown in dotted lines. The arm 58 of the bell crank is then caused to move in a clockwise direction whereby the actuating link 54 for the lower scoop 26 will be moved to the left and cause arm 60 secured to the scoop to move the scoop about the pivot 28 at its rear edge toward the closed dotted line position. At the same time that the operating rod 42 moves to close the scoop 26 it moves the arm 46 of the bell crank so as to cause the floating link 66 to swing about its pivoted connections 68 on arm 70. In this way the floating link is moved to the right as seen in Fig. 3 to move the actuating link 72 for the upper spoiler and the spoiler is thus moved toward its closed position.

On movement of the operating rod 42 in the opposite direction the spoiler and scoop are moved from their closed dotted line positions to their open operating positions shown in full line in Fig. 3. However, the linkage arrangement provided causes the scoop 26 to be moved through a much larger arc than the spoiler during the initial movement of the operating rod in opening the spoiler and flap to render the slot operative to control the aircraft. In fact, movement of the scoop preferably is sufficient to become effective and to produce a strong blast of air upward through slot 19 before the spoiler is raised far enough to produce any effective action whatever. The tendency for the spoiler to produce a momentary increased lift on opening is thus overcome completely and smooth, prompt, and positive control of the aircraft in the desired manner.

Due to the linkage employed, continued or further opening movement of the operating rod 42 (opposite to arrow 81) serves to move both the scoop and the spoiler toward a fully projected position but the final opening movement of the scoop is relatively slow, and there may even be a partial closing of the scoop while the spoiler is opened more rapidly. Thus when the end 56 of the actuating link 54 is moved through the arc indicated by the arrow 82, the further opening movement of the scoop is limited, whereas corresponding movement of the bell crank arm 46 causes the point 74 on the floating link to which the actuating link 72 is connected to move through an arc indicated by the arrow 84 so as to cause the upper spoiler to be opened rapidly.

Figure 2:
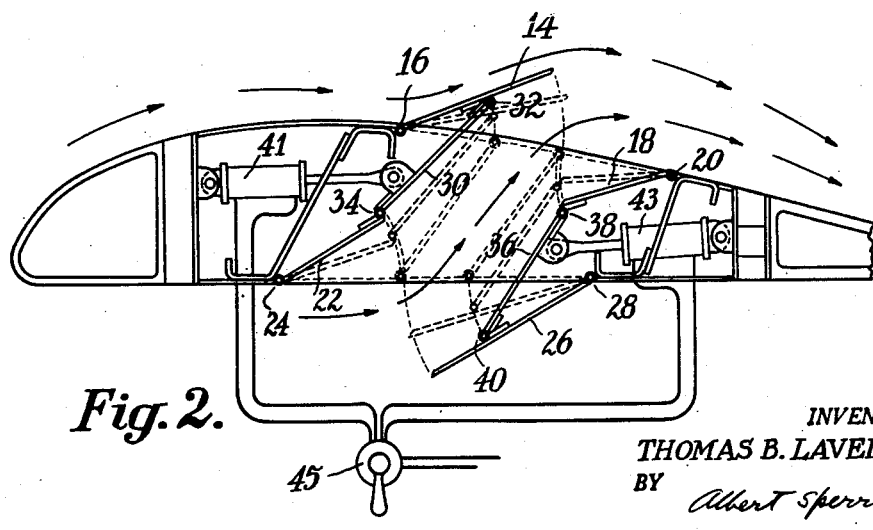
Fig. 2 is a diagrammatic sectional view of a portion of an air foil illustrating the manner of operation of a spoiler and scoop in accordance with my invention.
Figure 5:
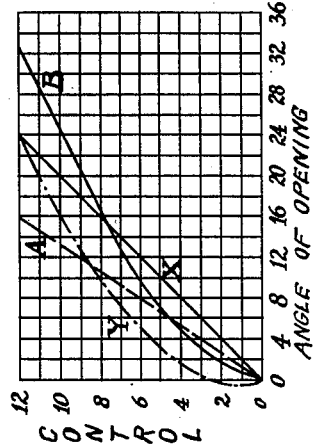
Fig. 5 is a graph showing typical movements of a spoiler and scoop in accordance with my invention.

The successive positions of opening of the scoop and spoiler when using a typical adjustment of the linkage or typical hydraulic or other actuating means is indicated in the table of Fig. 5 and is partially shown in dotted lines in Fig. 2. In this table the curves A and B represent one type of relative movement of the scoop and spoiler which may be effected with either mechanical, hydraulic, or other actuating means, while the curves X and Y represent an alternative type of relative movement of the scoop and spoiler which may be employed in accordance with my invention. Referring to curves A and B, curve A indicates the angular position of the scoop as it moves from its closed position toward an open position as the control member is moved to successive control positions. Curve B indicates the corresponding angular positions to which the spoiler is simultaneously moved as the scoop is opened. Similarly curve X represents successive positions of the scoop and curve Y represents successive positions of the spoiler on movement of a control member to successive positions represented by points on the vertical axis in Fig. 5.

In each case initial movement of the control member away from the zero position results in opening of the scoop (curves A and X) through a greater angle than the spoiler. In curves A and B the movement of the control from zero to position 2 causes the scoop to move through an angle of approximately three degrees whereas the spoiler is only raised through two degrees. It will be seen further that the angle of opening of the scoop and spoiler is not equal until the control member is moved beyond position 4 at which time both the scoop and spoiler are opened about six degrees. Further movement of the control member causes the spoiler to open faster than the scoop until at position 10, for example, the spoiler is open to about 24 degrees while the scoop is only open about 13 degrees.

In the adjustment represented by curves X and Y initial movement of the control member away from its zero position actually tends to close the spoiler whereas the air scoop opens at once. It is not until after the control member has moved beyond position 3 and the scoop has opened about six degrees that the spoiler begins to open. Thereafter both the spoiler and the scoop move toward their opened position but they are not opened to the same angular position until the control member is moved to position 12 and the spoiler and scoop are both opened about 24 degrees.

Wind tunnel tests on air foils indicate that both types of adjustment are effective in overcoming lag in the response of the air foil to the control means and in producing the desired loss of lift due to action of the slot in combination with a scoop and spoiler. Adjustments which afford a differential in movement of the air scoop and spoiler corresponding to curves X and Y are particularly effective in certain positions in the air foil. However, the positions, shape and movement of the spoiler and air scoop are capable of wide variations in adapting my invention to different situations. The curves shown in Fig. 5 are therefore only cited as typical of the variations in operation which are possible and to indicate the general nature of my invention. When using other and alternative types of actuating means and other adjustments of the parts or substitute elements in the assembly the relative positions of the scoop and spoiler and the form of the slot in cross section may be varied to attain the most effective control of the aircraft. Similarly alternative adjustments and changes in construction and operation of the air scoop and spoiler and the actuating means therefor may be resorted to when the slot is employed in different types of air foil, or is located in different positions therein,

I claim:

1. In an aircraft having an air foil, means forming a rearwardly inclined slot extending through the air foil from the lower to the upper surface thereof, an upper spoiler positioned adjacent the upper surface of said air foil, a lower air scoop positioned adjacent the lower surface of said air foil, said spoiler and scoop being movable from positions in which they close said slot to positions in which the slot is opened and the spoiler and scoop project from the adjacent surface of the air foil at aerodynamically effective positions, control means movable from a zero position to successive slot opening positions for moving the spoiler and scoop to each of said positions, and means actuated by the control means and connected to the spoiler and scoop, said means being operable on initial movement of the control means away from said zero position to move the scoop toward said opened position more rapidly than the spoiler.

2. In an aircraft having an air foil, means forming a rearwardly inclined slot extending through the air foil from the lower to the upper surface thereof, an upper spoiler positioned adjacent the upper surface of said air foil and pivotally movable about a line to the front of said slot into and out of a slot covering position, a lower air scoop positioned adjacent the lower surface of said air foil and pivotally movable about a line to the rear of said slot into and out of a slot covering position, said spoiler and scoop each having an edge movable outwardly from said slot covering position so as to project from the adjacent surface of the air foil in an aerodynamically effective position, and means for moving said spoiler and scoop to different but related positions including a common control member, and fluid operated means actuated by the control member for moving said spoiler and scoop toward said aerodynamically effective positions.

3. In an aircraft having an air foil, means forming a rearwardly inclined slot extending through the air foil from the lower to the upper surface thereof, an upper spoiler positioned adjacent the upper surface of said air foil and pivotally movable about a line to the front of said slot into and out of a slot covering position, a lower air scoop positioned adjacent the lower surface of said air foil and pivotally movable about a line to the rear of said slot into and out of a slot covering position, said spoiler and scoop each having an edge movable outwardly from said slot covering position so as to project from the adjacent surface of the air foil in an aerodynamically effective position and means for moving said spoiler and scoop to different but related positions including a common control member movable from zero position to successive slot opening position, actuating links connected to said spoiler and scoop and a means responsive to initial movement of the control member away from said zero position and connected to said actuating links for causing the scoop to have an initial opening movement prior to movement of the spoiler to said aerodynamically effective position.

4. In an aircraft having an air foil with a slot through said air foil which is inclined rearwardly in passing from the lower to the upper surface of the air foil, a pair of members respectively pivotally mounted adjacent the upper and lower surface of the air foil to the front of said slot, a second pair of members respectively pivotally mounted adjacent the upper and lower surface of the air foil to the rear of said slot, means defining opposite walls of said slot including two elements each of which is connected to one of said pairs of members and cooperates therewith to form a front unit and a rear unit repsectively, each of which units embodies a three bar linkage, and means for moving the members forming said units through different arcs and into and out of positions in which said slot defining means are in substantial parallelism.

5. In an aircraft having an air foil with a slot through said air foil which is inclined rearwardly in passing from the lower to the upper surface of the air foil, a pair of members respectively pivotally mounted adjacent the upper and lower surface of the air foil to the front of said slot, a second pair of members respectively pivotally mounted adjacent the upper and lower surface of the air foil to the rear of said slot, slot defining means including two elements each of which is connected to one of said pairs of members and cooperates therewith to form a front unit and a rear unit respectively, each of which units embodies a three bar linkage, control means for moving the rear unit downward while moving the front unit upward and differential means connected between said control means and units for effecting initial movement of the rear unit downward prior to effective upward movement of the front unit.

6. In an aircraft having an air foil with a slot through said air foil which is inclined rearwardly in passing from the lower to the upper surface of the air foil, a pair of members respectively pivotally mounted adjacent the upper and lower surface of the air foil to the front of said slot, a second pair of members respectively pivotally mounted adjacent the upper and lower surface of the air foil to the rear of said slot, means defining opposite walls of said slot including two elements each of which is connected to one of said pairs of members and cooperates therewith to form a front unit and a rear unit respectively, each of which units embodies a three bar linkage, control means for moving the rear unit downward while moving the front unit upward including hydraulic means connected to said units and actuated by said control means for effecting greater initial movement of the rear unit than the front unit.

THOMAS B. LAVELLE.

REFERENCES CITED

The following references are of record in the file of this patent:

UNITED STATES PATENTS

| Number | Name | Date |
|---|---|---|
| 1,280,195 | Eaton | Oct. 1, 1918 |
| 1,902,133 | Lavelle | Mar. 21, 1933 |
| 2,381,678 | Maxwell | Aug. 7, 1945 |

FOREIGN PATENTS

| Number | Country | Date |
|---|---|---|
| 510,546 | Great Britain | Aug. 3, 1939 |
| 518,670 | Great Britain | Mar. 5, 1940 |